United States Patent
Wachala et al.

(10) Patent No.: US 7,013,710 B2
(45) Date of Patent: Mar. 21, 2006

(54) OPEN PACKAGE TEST FIXTURE

(75) Inventors: Thomas Wachala, West Seneca, NY (US); Kenneth Haas, Basom, NY (US); Charles Patrick Connelly, Buffalo, NY (US)

(73) Assignee: Carleton Technologies, Inc., Orchard Park, NY (US)

( * ) Notice: Subject to any disclaimer, the term of this patent is extended or adjusted under 35 U.S.C. 154(b) by 17 days.

(21) Appl. No.: 10/805,068

(22) Filed: Mar. 19, 2004

(65) Prior Publication Data

US 2005/0204801 A1    Sep. 22, 2005

(51) Int. Cl.
   *G01M 3/02* (2006.01)
(52) U.S. Cl. .................. 73/37; 73/40; 73/49.2
(58) Field of Classification Search .............. 73/37, 73/40, 49.2
   See application file for complete search history.

(56) References Cited

U.S. PATENT DOCUMENTS 3,027,753 A * 4/1962 Harder, Jr. ............... 73/40.7
3,813,923 A * 6/1974 Pendleton ................. 73/49.2
4,539,836 A   9/1985 Hester et al.
4,813,268 A * 3/1989 Helvey .................... 73/40.7
5,850,036 A * 12/1998 Giromini et al. ........... 73/40
5,872,309 A   2/1999 Pinter
6,105,419 A   8/2000 Michels et al.
6,202,477 B1  3/2001 Lehmann
6,354,142 B1 * 3/2002 Nothhelfer et al. ........ 73/49.3
6,460,405 B1  10/2002 Mayer et al.
6,513,366 B1  2/2003 Stauffer .................. 73/49.3

* cited by examiner

*Primary Examiner*—Daniel S. Larkin
(74) *Attorney, Agent, or Firm*—Jaeckle Fleischmann & Mugel, LLP

(57) ABSTRACT

The test fixture of the present invention comprises a pair of clamping bars/jaws, matched to accommodate an inflation port, or a pressure supply/sensing nozzle. The clamping jaws further comprise a layer of leak proof crushable material, for helping retain the item being tested. When the jaws are activated, the jaws and leak proof crushable material serve to effectively seal the package on the remaining side, and about the pressure supply/sensing nozzle.

14 Claims, 2 Drawing Sheets

OPEN PACKAGE TEST FIXTURE

FIELD OF THE INVENTION

The present invention is directed to a method and apparatus for testing seal integrity in open packages; and more particularly to a non-destructive method and apparatus for testing seal integrity in open packages.

BACKGROUND

There are numerous methods and devices in use to ensure the integrity of packaged goods such as sterile medical packages, pharmaceuticals, or food. Moreover, numerous methods for testing the integrity of the packages are known, and relate directly to the packaging in which a product is housed. For example, testing of products packaged in non-flexible containers employ procedures which do not apply to testing of products in flexible containers. Furthermore, the majority of testing methods are destructive, and leave the tested flexible containers in non-serviceable condition.

Methods and devices for testing the integrity of seals on packages are known. One such method and device is the apparatus and process for inspecting sealed packages described in U.S. Pat. No. 6,105,419. The device provides an apparatus for inspecting sealed packages of product, and requires a conveyor belt for receiving the packages. An inspection belt contacts the packages and moves away from the conveyor belt a particular distance depending on whether the packages are properly sealed. When engaged by a package with a good seal, the inspection belt is moved a first distance which causes an indicator carried thereon to send a signal which prevents removal of the good package from the conveyor belt. However, when a leaky bag contacts the inspection belt, the inspection belt is moved a second distance which is insufficient to cause the indicator to send a signal. Consequently, the improperly sealed package is removed from the conveyor belt. The inspection belt may be mounted for linear or pivotal movement upon being contacted by the packages carried by the conveyor belt. In addition, a package engaging member can be used to press the packages prior to passing under the inspection belt to facilitate the discharge of air from leaky packages.

While the above method provides a method of testing seals on packages, the method requires a conveyer belt and the package engaging member may actually damage the package. Additionally, this method does not provide quantitative data regarding leakage.

Another method for leak testing and leak testing apparatus is described in U.S. Pat. No. 6,202,477. The device serves to leak test closed containers which are filled with a filling product containing at least one liquid component. The container is introduced in a test cavity which is evacuated at least down to vapor pressure of that liquid component. The pressure in the surrounding of the container and thus within test cavity is monitored. Monitoring is performed by a vacuum pressure sensor, whereas lowering pressure surrounding the container is performed by a vacuum pump. Leakage is detected by monitoring a pressure change in the surrounding of the container which is due to evaporation of liquid emerging from a leak and being evaporated in the low pressure surrounding.

While the above method and apparatus serve to leak test packages, the packages are already sealed on all sides. Additionally an extremely complex apparatus is necessary to perform the testing.

Furthermore, safety is an important issue in the operation of pneumatic devices. Because of the forces generated by many of the testing devices, it is essential to develop a test apparatus and method that assures that the operator's extremities, such as hands or fingers, do not become trapped within the testing apparatus.

What is needed in the art is a leak testing apparatus for packages that is non-destructive to the packages under test.

Furthermore, what is needed in the art is a leak testing apparatus that provides features that assure that the operator does not sustain injury while performing testing.

SUMMARY OF THE INVENTION

The present invention provides a non-destructive pneumatically actuated test fixture and method for creating a temporary leak proof seal, on a package that is permanently sealed on the three other sides, to test for leakage using positive pressure. Additionally, the present invention comprises safety measures that assure the operator's fingers are not caught in the apparatus.

The test fixture comprises a pair of clamping jaws, matched to accommodate an inflation port, or a pressure supply/sensing nozzle. The clamping jaws further comprise a layer of leak proof crushable material, for helping retain the item being tested. When the jaws are pneumatically, mechanically, or electrically activated, they close upon the open side of the package under test, and the aforementioned leak proof crushable material serves to effectively seal the package on the remaining side and about the pressure supply/sensing nozzle. The damming effect caused by the crushing of the sealing material precludes gas from escaping from the open side of the package.

Additionally, actuation of the pneumatic cylinders or other force generating apparatus allows the operator to conduct high or low pressure leak or seal strength testing. At the completion of the test, the package is released from the fixture by actuating the release actuator, which relieves the clamping force and opens the clamping mechanism.

BRIEF DESCRIPTION OF THE DRAWING

The above-mentioned and other features and advantages of this invention, and the manner of attaining them, will become appreciated and be more readily understood by reference to the following detailed description of one embodiment of the invention in conjunction with the accompanying drawing, wherein.

DETAILED DESCRIPTION

Figure 1:
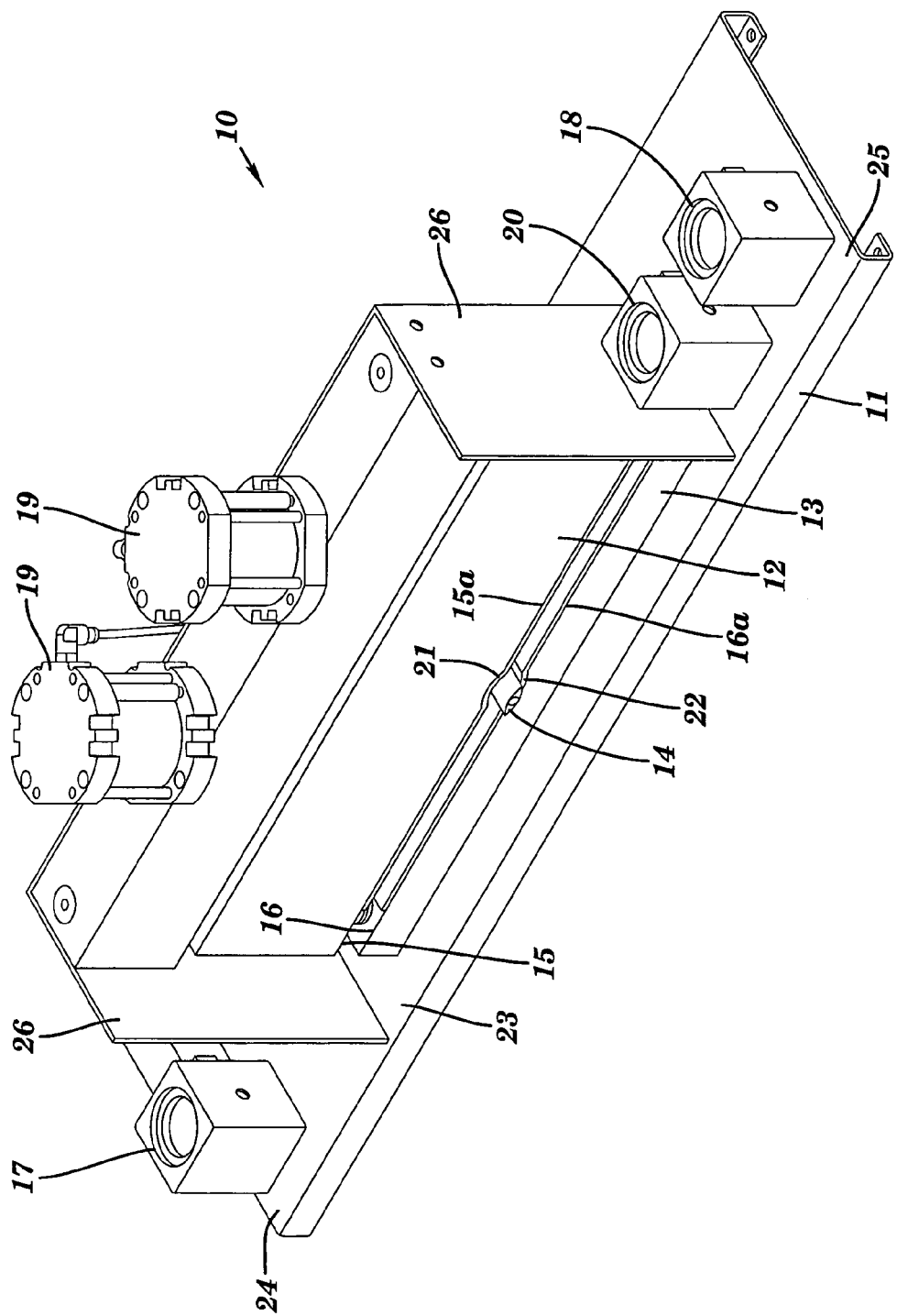
FIG. 1 is a front isometric view of the open package test fixture of the present invention.

Referring to FIG. 1, a front isometric view of the open package test fixture 10 of the present invention is shown. The test fixture comprises a test fixture body 11, having an upper clamping jaw 12 and a lower clamping jaw 13. The clamping jaws are machine matched to accommodate the inflation port's narrow, knife-edged profile. Additionally the fixture comprises a pressure supply/sensing nozzle 14 located between the upper clamping jaw 12 and lower clamping jaw 13. Furthermore, both the upper clamping jaw 12 and the lower clamping jaw 13 comprise face regions. The upper clamping jaw 12 comprises an upper clamping jaw face region 15, and the lower clamping jaw comprises lower clamping jaw face region 16. The upper and lower clamping jaw face regions 15, 16 are each covered with a leak proof crushable material 15a and 16a respectively. The leak proof crushable material of 15a and 16a each have a sufficient coefficient of friction to hold the package during testing, prevent slippage, and form a back seal against the open end of the package being tested. The pressure supply/sensing nozzle 14 located between the upper clamping bar 12 and lower clamping bar 13 is adapted to receive the package being tested.

In operation, placing the package mouth in the center of the crushable material causes the material to form a unified seal behind, and along the sides of the open end of the package. Any gas that would escape from the open mouth of the package will be effectively stopped by the damming effect caused by the crushing of the sealing material.

Furthermore, the upper clamping jaw 12 has an upper clamping jaw mating surface 21 and the lower clamping jaw 13 has a lower clamping jaw mating surface 22. The upper clamping jaw mating surface 21 and lower clamping jaw mating surface 22 are positioned to accommodate the pressure supply/sensing nozzle 14 located there between.

Figure 2:
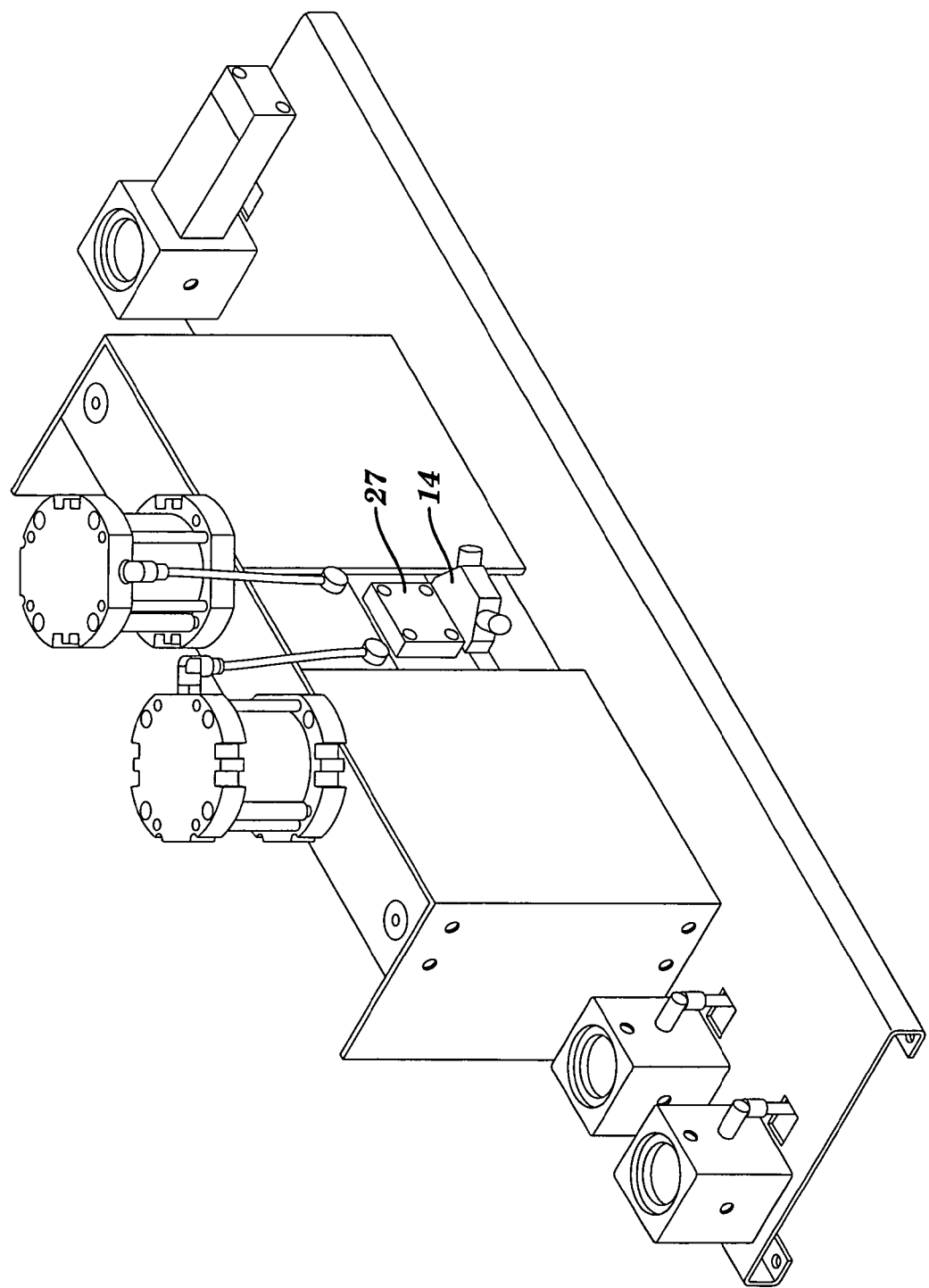
FIG. 2 is a rear isometric view of the open package test fixture of the present invention.

Referring now to FIG. 2 a rear isometric view of the open package test fixture of the present invention is shown. The pressure supply/sensing nozzle 14 is positioned using a precision nozzle orientation guide 27 such that said pressure supply/sensing nozzle 14 is suspended between the open clamping jaws. This allows placement of the package under test about the pressure supply/sensing nozzle 14 and between the upper and lower clamping jaws. The precision nozzle orientation guide 27 maintains proper alignment of the pressure supply/sensing nozzle 14 with respect to the mating surfaces of the upper and lower clamping jaws.

Referring again to FIG. 1, once the package is properly placed in the fixture, a user may conduct high or low pressure leak or seal strength testing on a large variety of packages. Additional embodiments are contemplated wherein the fixture can be scaled to accommodate larger packages by adding additional pneumatic cylinders or mechanical actuators, and increasing the width of the fixture.

At the completion of the test, the package is released from the fixture by actuating the release mechanism 20. This release mechanism 20 serves to relieve the clamping force and open the clamping mechanism.

Due to the tremendous forces involved with the actuation of the pneumatic cylinders 19 or other types of mechanical actuation, there is a concern for the safety of the operator who is possibly subject to crushing injuries. This safety issue is addressed by utilizing an anti-tie down, two handed actuation system. The test fixture comprises a unique pneumatic circuit, used to allow a latching of the pneumatic force cylinders 19 during testing. The user can actuate the clamping device and walk away without need for manual contact. Referring to the FIG. 1, the first and second anti-tie down safety actuators 17 and 18 respectively are shown. The fixture plate body 11 further comprises a fixture plate base 23. The fixture plate base 23 has a first side 24 and a second side 25, wherein said upper clamping jaw 12 and said lower clamping jaw 13 are located between said first side of said fixture plate body and said second side of said fixture plate body 11. Furthermore, the first anti-tie down safety actuator 17 is located proximate to said first side 24 of said fixture base plate 23 and said second anti-tie down safety actuator 18 is located proximate to said second side 25 of said fixture base plate 23. To actuate said test fixture the operator is required to depress each of the aforementioned actuators simultaneously, thereby precluding the operator from inadvertently catching his fingers between the clamping jaws.

Additionally, a barrier 26 is included to prevent the user from inadvertently placing fingers between the clamping jaws during actuation.

Furthermore, the fixture is designed to accommodate a restraining plate apparatus that mates to the front of the fixture and provides the ability to conduct restrained testing of the package.

While this invention has been described as having a preferred design, the present invention can be further modified within the spirit and scope of this disclosure. This application is therefore intended to cover any variations, uses, or adaptations of the present invention using the general principles disclosed herein.

We claim:

1. An open package test fixture for testing the seal strength of flexible packages comprising:
   upper and lower clamping jaws, wherein each of said upper clamping jaw and said lower clamping jaw further comprise a face region, and said face region of at least one of said clamping jaws further comprises a leak proof crushable material;
   a pressure supply/sensing nozzle;
   a pair of actuators for initiating a clamping force; and
   an actuator for releasing the clamping force.

2. The open package test fixture of claim 1 wherein said pressure supply/sensing nozzle is located between said upper clamping jaw and said lower clamping jaw.

3. The open package test fixture of claim 1 wherein said upper clamping jaw further comprises an upper clamping jaw mating surface and said lower clamping jaw further comprises a lower clamping jaw mating surface.

4. The open package test fixture of claim 3 wherein said upper clamping jaw mating surface and said lower clamping jaw mating surface are positioned to accommodate said pressure supply/sensing nozzle located there between.

5. The open package test fixture of claim 1 further comprising a fixture plate body having a fixture plate base.

6. The open package test fixture of claim 5 wherein said fixture plate base has a first side and a second side, and said upper clamping jaw and said lower clamping jaw are located between said first side of said fixture plate body and said second side of said fixture plate body.

7. The open package test fixture of claim 6 wherein said pair of actuators further comprises a first anti-tie down safety actuator and a second anti-tie down safety actuator, wherein said first anti-tie down safety actuator is located proximate to said first side of said fixture base plate, and said second anti-tie down safety actuator is located proximate to said second side of said fixture base plate.

8. The open package test fixture of claim 7, wherein said open package test fixture is actuated by pressing said first anti-tie down safety actuator and said second anti-tie down safety actuator concurrently.

9. The open package test fixture of claim 1 further comprising a precision nozzle orientation guide, wherein said supply/sensing nozzle is affixed to said open package test fixture using said precision nozzle orientation guide to ensure proper alignment and a leakproof seal when mated together.

10. The open package test fixture of claim 1 further comprising a barrier for preventing a user from inserting his fingers between the clamping jaws when actuating said open package test fixture.

11. The open package test fixture of claim 1 further comprising a high pressure gas supply.

12. An open package test fixture for testing the seal strength of flexible packages comprising:
- a pair of clamping jaws having mating surfaces;
- a crushable material attached to said jaws;
- a pressure supply/sensing nozzle;
- a precision nozzle orientation guide;
- a pair of actuators for initiating a clamping force;
- an actuator to releasing the clamping force; and
- a barrier to prevent insertion of fingers into said jaws while actuating the clamping force.

13. The open package test fixture of claim 12 further comprising a force generating means.

14. The open package test fixture of claim 13 wherein said force generating means comprises a high pressure gas supply.

* * * * *